Oct. 27, 1959    F. W. SAMPSON    2,910,145
BRAKE STRUCTURE
Filed Nov. 19, 1956

INVENTOR.
FREDERICK W. SAMPSON
BY
ATTORNEY

United States Patent Office 2,910,145
Patented Oct. 27, 1959

2,910,145

BRAKE STRUCTURE

Frederick W. Sampson, Dayton, Ohio, assignor to General Motors Corporation, Detroit, Mich., a corporation of Delaware Application November 19, 1956, Serial No. 623,135

4 Claims. (Cl. 188—78)

This invention relates to a vehicle brake and is particularly concerned with a heavy duty vehicle brake having uniform braking characteristics.

It is, therefore, the main object of this invention to provide a friction lining for a brake shoe, such as a secondary brake shoe, which is segmented and includes two end portions of a friction material which has a static coefficient higher than its coefficient of dynamic friction and an intermediate or center portion of another friction material which has a coefficient of static friction not exceeding its coefficient of dynamic friction.

It is another object of the invention to provide a segmented brake lining including porous ferrous friction facings having a portion of another friction facing interposed radially therebetween wherein the interposed portion of facing has a coefficient of static friction which does not exceed its coefficient of dynamic friction, the area of the ferrous friction facing being greater than the area of the interposed facing.

Another object of the invention is to provide a segmented brake lining including a porous ferrous facing portion having substantial quantities of graphite therein and including an interposed portion of a nonmetallic friction material intermediate portions of the ferrous facing material which nonmetallic facing has a coefficient of static friction which does not exceed its coefficient of dynamic friction.

A still further object of the invention is to provide a brake assembly for a vehicle comprising a rotatable brake drum and including two brake shoes therein, each of said shoes having brake linings thereon in opposed relation to one another and adapted to bear on the internal surface of the drum, expansible means being provided for forcing the shoes into braking contact with the drum, at least one of said shoes having a ferrous friction facing thereon and including, at the area of final contact between the shoe and the drum upon stopping of the drum, a portion of another friction material having an area less than the area of the ferrous friction material, said portion of another friction material having a coefficient of static friction which does not exceed its coefficient of dynamic friction.

Further objects and advantages of the present invention will be apparent from the following description, reference being had to the accompanying drawings wherein preferred embodiments of the present invention are clearly shown.

Figure 1:
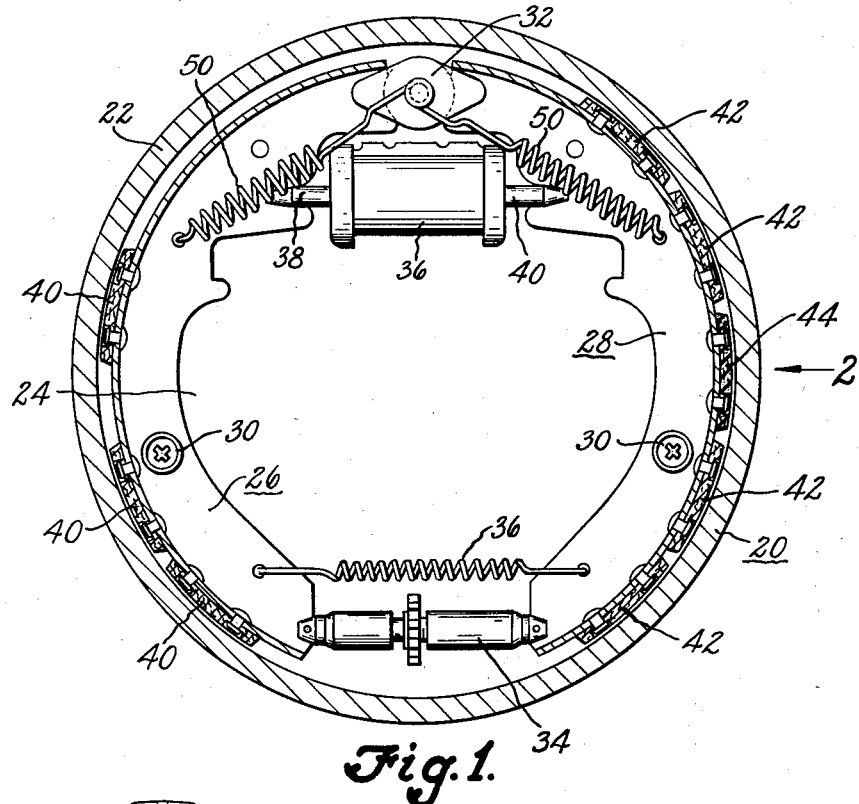
Figure 1 is a plan view partly in section of an internal expanding brake including a brake drum, primary and secondary shoes with linings and operating mechanism.
Figure 2:
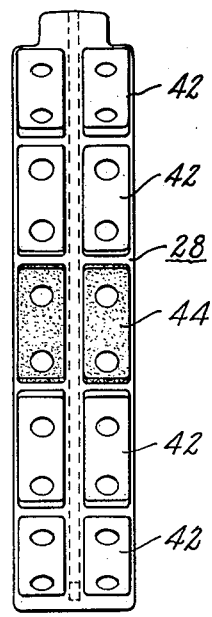
Figure 2 is a plan view of the lining components of the secondary shoe taken in the direction of the arrow marked 2 in Figure 1.

In certain types of vehicle brakes, the linings thereof are formed from porous ferrous material including substantial quantities of graphite. Such a brake lining is clearly disclosed in copending application, S.N. 540,842, filed October 17, 1955, and assigned to the assignee of the present invention. These linings have extremely good braking characteristics and are long wearing.

When these linings are used in the standard type of internal expanding brakes, for example, wherein two brake shoes are used which are forced outwardly into contact with a rotating brake drum, they have a tendency to "grab," "grunt" or "groan" at the time the vehicle is being drawn to a complete stop. This is caused by the fact that the ferrous friction material has a high coefficient of static friction at least equal to its coefficient of dynamic friction and, therefore, when the speed of the vehicle is reduced as it approaches a stop, there is a tendency for the lining to "grab" at the instant of stopping which causes jerky operation in some instances just before the vehicle is stopped. This condition is not apparent when using standard nonmetallic types of linings since these linings, for example, linings as disclosed in U.S. Patents 2,569,539 and 2,553,215, generally have lower coefficients of static friction than their coefficient of dynamic friction and, in any case, their coefficient of static friction does not exceed their coefficient of dynamic friction. Therefore, as the vehicle comes to a stop, the effective coefficient of friction drops off which prevents the "groaning" and "grunting" and attendant "grabbing" of the brakes.

When a brake of the internal expanding type is applied, due to the pressures involved and the points of application thereof, the brake shoes are actually distorted slightly out of round as is the brake drum. I have found, therefore, that when the brake is being released as the vehicle comes to a stop, that the actual area of final contact of the shoe and drum occurs adjacent the center portion of the shoe only due to this distortion which, upon release of pressure, permits the shoe and drum to assume their normal shape. This means that the arc of the shoe and the arc of the drum at the instant of stopping are essentially tangential to one another in a transverse zone herein called the area of final contact. This out-of-round condition of the components of the brake is more easily explained by the fact that the pressure during braking is applied adjacent the ends of the shoe and supported by the drum throughout its length, causing the drum to become somewhat elliptical. Upon release of pressure, both drum and shoes assume their normal radii whereby the shoe is out of round or of a smaller radius with respect to the drum. In any case, there is an area of final contact and it is braking within this area that causes the undesirable "grab," "grunt" or "groan," when the lining has a coefficient of static friction in excess of its coefficient of dynamic friction.

I have found that all of the benefits of a porous ferrous friction lining may be maintained and the undesirable "grunt" or "groan" may be eliminated by utilizing a composite friction lining which is made up essentially of the porous ferrous friction material but which includes a portion or segment of another friction material adjacent the area of final contact which has the desired frictional characteristics. Thus, all of the benefits of the ferrous friction lining are maintained while the undesirable noise factors are completely eliminated. This intermediate section of different material will wear adequately in conjunction with the ferrous portions of the lining because it is placed between metallic lining blocks and, therefore, can only wear in a pattern dictated by the over-all wear pattern of the shoe.

Referring specifically to the drawings, one form of an internal expanding brake is shown at 20 in Figure 1 which may be used in connection with vehicles such as automobiles and the like. The brake includes a drum 22 usually formed from cast iron or other suitable material which is carried by a wheel. A support plate 24 carried by the axle housing acts as a support for the components of the expanding brake mechanism which includes primary shoe 26 and a secondary shoe 28 loosely held to the support plate 24 by means of spring pressed clips 30 which pass through over-sized holes, not shown, so the shoe may shift with respect thereto. The primary and secondary shoes 26 and 28 are rotatable around a pivot point 32 at the top of the assembly and held thereto by springs 50. The shoes are adjustable with respect to the brake drum by means of a screw adjustment 34 between their lower ends. The adjustment 34 is held in place by a spring 36. At the upper end and supported on the plate 24 is a brake cylinder 36 having opposed pistons 38 and 40 therein which are actuated by fluid from a system, not shown. Supported on and carried by the primary shoe 26 are a plurality of brake lining blocks 40; in this case, riveted to the shoe and comprising segments of friction material preferably porous ferrous material. Attached to and carried by the brake shoe 28 is also a plurality of friction blocks 42 and 44. In this instance, all of the blocks 42 are the same material while the blocks 44 are a different material. Specifically, the blocks 42 are porous ferrous friction material as hereinbefore defined while the blocks 44 are either a molded nonmetallic material comprising fillers, resinous binders and friction fortifying materials of the general type disclosed in the aforementioned patents or any other material having a static coefficient which does not exceed its dynamic coefficient of friction. It will be noted that eight blocks of the ferrous friction material are used while only two blocks of the nonmetallic friction material are used and these two blocks are positioned within the area of final contact when the brake is being released.

This is explained in more detail by describing the action of the brake. When the brake pedal is depressed, fluid from the hydraulic system enters the cylinder 36 and causes the pistons 38 and 40 to move outwardly away from one another which causes the brake bands 26 and 28 to move outwardly into contact with the brake drum 22. It is apparent that the end portions only of the band or shoe have outward forces exerted thereagainst while the drum is resisting these forces throughout the shoe length. Therefore, the shoe distorts increasing its radius with respect to the drum radius under load and a common wear radius results while under load. Similarly, as the brake shoe is pressed outwardly, the drum 22 will distort to conform to the distortion of the brake shoe which will cause the entire drum to assume a somewhat elliptical shape. These facts are proved by wear on the brake linings which always will rock in a drum when not under load showing that the unloaded shoe radius is smaller than the unloaded drum radius. Upon release of the brake and upon release of fluid pressure in the cylinder 36, springs 50 will draw the brake shoes inwardly away from the drum 22. When this occurs, the drum tends to assume its normal circular shape while the brake shoes, with their linings, move away from the drum. This leaves the segment 44 on the secondary shoe in an area of final contact between the shoe and the drum and it is at this point in the operation that the vehicle is coming to a complete stop. At this point, therefore, the static coefficient of friction of the material comes into play and, if this is higher than its dynamic coefficient of friction, the brake lining tends to "grab" and cause a "grunt" or "groan" as the vehicle comes to a complete stop.

As hereinbefore set forth, if a pad or segment of lining material is positioned within this area of final contact wherein the friction material of the pad or segment has a static coefficient of friction not in excess of its dynamic coefficient of friction, the vehicle will come to an easy stop without "grabbing" and attendant "groaning." In this manner, the many advantages found in metallic linings are made available together with the quietness and smooth stopping qualities of conventional linings.

I have found, in a brake of the type illustrated with a ferrous brake lining, that by positioning a portion of a different lining as noted on the secondary shoe only, it is possible to provide a very effective brake having good braking and wearing characteristics. Further, the wear of the different portion of the lining will be substantially equal to the wear of the metallic portion due to the normal conditions present in the brake assembly wherein the center segment does not receive any more work than that allowed by the segments on each side of it.

I have found that it is unnecessary to modify the primary shoe lining since this shoe acts in an additive manner to enhance the operation of the secondary shoe and does not contribute to the "grunting" and "groaning" during the final stop of the vehicle.

The use of the same combination on each shoe of a two leading shoe type brake or in a leading and trailing shoe brake is also within the scope of my invention and the specific brake described is used for illustrative purposes only. In fact, in any instance where "grabbing" and attendant "grunting" and "groaning" is experienced in brakes, due to the use of a lining which has a coefficient of dynamic friction less than its coefficient of static friction, the use of a segment of a friction material whose static coefficient does not exceed its dynamic coefficient of friction placed in the area of last contact will improve the condition greatly and substantially eliminate the undesirable noises.

While the invention described herein is illustrated through the use of a molded nonmetallic lining as one which has a static coefficient which does not exceed its dynamic coefficient of friction, it is understood that any friction material which will meet this limitation can be used, for example, nonmetallic materials including metal powders in varying degrees or including metal screen, woven materials, graphite blocks and other suitable materials which meet the frictional requirements. In all cases as herein pointed out, the wear characteristics of the interposed segment are not of great importance since the wear on this segment is limited by the wear on the main portion of the brake lining, namely, the portions which have a higher coefficient of static friction than the coefficient of dynamic friction as exemplified by the ferrous metal lining. Therefore, any friction material which is interposed and which has the desired friction characteristics will operate quite well. In other words, the invention defined in the present disclosure is specifically directed to a brake combination wherein the brake lining used in combination with the brake drum is predominantly made of a material having a coefficient of dynamic friction which is less than its coefficient of static friction and wherein a segment of another type of friction material is placed at the area of final contact of the brake lining which has a coefficient of static friction that does not exceed its coefficient of dynamic friction.

While the embodiments of the present invention as herein disclosed constitute preferred forms, it is to be understood that other forms might be adopted.

What is claimed is as follows:

1. A brake shoe for an internal expanding brake which includes, operating means and a brake drum adapted to rotate relative to the shoe, the combination comprising, a metal support, a brake lining including a plurality of metal lining segments comprising porous sintered ferrous material with graphite attached to and carried by said support each of which has a coefficient of static friction which exceeds its coefficient of dynamic friction, and a segment of another friction material which has a coefficient of static friction that does not exceed its coefficient of dynamic friction, said last mentioned segment being positioned adjacent the area of final contact between the lining and the drum when the relative rotation between the two ceases.

2. A brake shoe for an internal expanding brake which includes, operating means and a brake drum adapted to rotate relative to the shoe, the combination comprising, a metal support, a brake lining including an even number of metal lining segments, comprising porous sintered ferrous material with graphite, attached to and carried by said support each of which has a coefficient of static friction which exceeds its coefficient of dynamic friction, and a single segment of another friction material which has a coefficient of static friction that does not exceed its coefficient of dynamic friction positioned between said metal lining segments so that an equal number of metal lining segments are present at either side thereof, said single segment being positioned adjacent the area of final contact between said lining and the brake drum when the relative rotation between the two ceases.

3. A brake shoe for an internal expanding brake which includes, operating means and a brake drum, the combination comprising, an arcuate metal support, a segment of nonmetallic friction material attached to and carried by said support adjacent the center of the arc thereof wherein the position of the material is substantially at the area of final contact between the brake shoe and the brake drum when the relative rotation between the two ceases, said friction material having a coefficient of static friction that does not exceed its coefficient of dynamic friction and substantially equal areas at either side of said segment carried by and supported by the shoe of sintered ferrous friction material including substantial quantities of graphite, said ferrous friction material having a coefficient of static friction which exceeds its coefficient of dynamic friction.

4. A brake assembly for a vehicle, comprising, a rotatable brake drum, relatively stationary brake shoes in opposed relation to one another and adapted to bear against the internal surface of said drum, means cooperating with the shoes for expanding them into frictional engagement with the drum, friction linings on said shoes, the friction lining on at least one of said shoes consisting of a facing formed from two separate and different materials, the first of which exceeds the area of the second and comprises a porous sintered ferrous material having substantial quantities of graphite therein, the second material of said facing comprising a substantially nonmetallic molded friction material, said second material being positioned intermediate portions of the first mentioned material and at the area of final contact between the shoe and drum as the brake is being released after having been in braking position.

References Cited in the file of this patent

UNITED STATES PATENTS

| | | |
|---|---|---|
| 2,355,419 | Bruce | Aug. 8, 1944 |
| 2,431,774 | Schumacher | Dec. 2, 1947 |

FOREIGN PATENTS

| | | |
|---|---|---|
| 448,351 | Great Britain | June 8, 1936 |
| 520,353 | Great Britain | Apr. 22, 1940 |
| 544,716 | Great Britain | Apr. 24, 1942 |